US012087151B1

(12) United States Patent
Gray et al.

(10) Patent No.: US 12,087,151 B1
(45) Date of Patent: Sep. 10, 2024

(54) EMERGENCY SIGNALING SYSTEM

(71) Applicant: UIPCO, LLC, San Antonio, TX (US)

(72) Inventors: Emily Margaret Gray, San Antonio, TX (US); Brian Francisco Shipley, Plano, TX (US); Justin Dax Haslam, San Antonio, TX (US); Robert Wiseman Simpson, Fair Oaks Ranch, TX (US); Donnette Moncrief Brown, San Antonio, TX (US); Eric David Schroeder, San Antonio, TX (US); Michael J. Maciolek, Boerne, TX (US); Bobby Lawrence Mohs, San Antonio, TX (US); Manfred Amann, San Antonio, TX (US); Rochelle Ann Tijerina, San Antonio, TX (US); Meredith Beveridge, Golden, CO (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/365,401

(22) Filed: Aug. 4, 2023

Related U.S. Application Data

(62) Division of application No. 17/821,847, filed on Aug. 24, 2022, now Pat. No. 11,763,644, which is a
(Continued)

(51) Int. Cl.
*G08B 5/00* (2006.01)
*G08B 5/06* (2006.01)
*G08C 17/00* (2006.01)

(52) U.S. Cl.
CPC ............... *G08B 5/002* (2013.01); *G08B 5/06* (2013.01); *G08C 17/00* (2013.01)

(58) Field of Classification Search
CPC .......... B64D 25/20; G08B 5/002; G08B 5/06; G09F 15/0062; G09F 13/20; G08C 17/00; A63B 29/021; A63B 29/022
See application file for complete search history.

(56) References Cited

U.S. PATENT DOCUMENTS

| 3,526,200 A | * | 9/1970 | Doyle | .................... | E01F 9/688 |
| | | | | | 116/63 P |
| 3,768,436 A | | 10/1973 | Martini | | |

(Continued)

OTHER PUBLICATIONS

Notice of Allowance mailed Aug. 8, 2022 for U.S. Appl. No. 17/010,910.

(Continued)

*Primary Examiner* — Andrew W Bee
(74) *Attorney, Agent, or Firm* — Plumsea Law Group, LLC

(57) ABSTRACT

An emergency signaling system is disclosed. The system includes a receptacle and a painting device. The painting device is covered in a paint material and stored in the receptacle. The receptacle can be used to launch the painting device onto a surface, such as a roof, in the event that a user needs to signal a search and rescue team or anyone near their present location. The painting device, upon contact with a surface, creates a painted signal. The painted signal can have different shapes according to the shape of the painting device. The painting device can include weight members or flexible frame members to facilitate opening the painting device from a closed or folded configuration to a fully open configuration once the painting device has been launched from the receptacle.

14 Claims, 12 Drawing Sheets

Related U.S. Application Data division of application No. 17/010,910, filed on Sep. 3, 2020, now Pat. No. 11,514,763.

(60) Provisional application No. 62/896,826, filed on Sep. 6, 2019.

(56) References Cited

U.S. PATENT DOCUMENTS

| | | |
|---|---|---|
| 5,007,368 A | 4/1991 | Bush |
| 6,260,508 B1 | 7/2001 | Morse |
| 8,832,981 B2 | 9/2014 | Desaulniers |
| 2003/0094127 A1 | 5/2003 | Stelmach |
| 2009/0053946 A1 | 2/2009 | Ashby |
| 2012/0260545 A1 | 10/2012 | Desaulniers |
| 2015/0128845 A1 | 5/2015 | Desaulniers |

OTHER PUBLICATIONS

Notice of Allowance mailed May 15, 2023 for U.S. Appl. No. 17/821,847.

* cited by examiner

EMERGENCY SIGNALING SYSTEM

CROSS-REFERENCE TO RELATED APPLICATIONS

This application is a Divisional Application of Gray et al., U.S. Pat. No. 11,763,644, issued on Sep. 19, 2023 (now U.S. application Ser. No. 17/821,847 filed on Aug. 24, 2022), and titled "Emergency Signaling System", which is a Divisional Application of Gray et al., U.S. Pat. No. 11,514,763, issued on Nov. 29, 2022 and titled "Emergency Signaling System" which claims the benefit of U.S. Provisional Patent Application No. 62/896,826 filed on Sep. 6, 2019, and titled "Emergency Signaling System". The disclosures of which are incorporated by reference in their entirety.

TECHNICAL FIELD

The present disclosure generally relates to methods and systems for providing emergency signals, and specifically to providing emergency signals that may be visible from a distance.

BACKGROUND

During disasters such as hurricanes, tornadoes, floods, and fires, residents of the associated disaster area may become trapped inside their homes or other structures. It may be necessary for the residents to provide some indication to search and rescue teams that they require assistance and/or need to be evacuated. Flares can provide one-time signaling, however these signals may not be detected if the search and rescue teams are not in the vicinity of the resident when the flare is deployed.

There is a need in the art for a system and method that addresses the shortcomings discussed above.

SUMMARY

In one aspect, an emergency signaling system includes a receptacle with a receiving cavity, a lid enclosing the receiving cavity, and an actuating assembly. The system also includes a painting device disposed within the receiving cavity of the receptacle and a paint material filling a portion of the receiving cavity of the receptacle. In a first state the lid is closed and prevents the paint material from leaking out of the receiving cavity. In a second state the lid is open and the actuating assembly causes the painting device to be launched from the receiving cavity.

In another aspect, an emergency signaling system for use on a roof of a building includes a receptacle with a receiving cavity, an actuating assembly, a mounting portion that can be secured to the roof of the building, and an actuating controller connected to the actuating assembly. The system also includes a painting device disposed within the receiving cavity of the receptacle, a paint material filling a portion of the receiving cavity of the receptacle, and a remote control device. The remote control device sends a signal to the actuating controller to activate the actuating assembly, and wherein the actuating assembly launches the painting device from the receptacle onto the roof of the building to apply a painted signal to the roof.

In another aspect, a deployable device for use in an emergency includes a central portion, a first arm portion, a second arm portion, a third arm portion, and a fourth arm portion. The device also includes a first frame member disposed along the first arm portion, a second frame member disposed along the second arm portion, a third frame member disposed along the third arm portion, and a fourth frame member disposed along the fourth arm portion. The first frame member, the second frame member, the third frame member and the fourth frame member are flexible. The deployable device has a folded configuration in which the first frame member, the second frame member, the third frame member, and the fourth frame member are all bent. The deployable device also has a fully open configuration in which the first frame member, the second frame member, the third frame member, and the fourth frame member are all substantially straight.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF THE EMBODIMENTS

An emergency signaling system is disclosed. The emergency signaling system comprises a receptacle storing a painting device and paint material. The receptacle can be used to launch the painting device, which may be covered in paint material, onto a nearby surface, such as a roof, driveway, or lawn. When launched, the painting device opens up and applies the paint material to the surface. After the painting device has been removed, either manually, or from rain or wind, a painted signal is left behind on the surface having the same shape as the painting device. The painted signal can be easily seen from above by search and rescue teams traveling by airplane or helicopter over a disaster area. The painted signal may also be visible in any images captured by unmanned drones surveying the disaster area. This allows the search and rescue teams to easily identify houses or other structures where occupants may be stranded and in need of assistance and/or evacuation.

Using a painting device allows paint to be applied in a precise pattern (corresponding to the shape of the painting device), so that the corresponding painted signal is easily distinguishable from other colorings or features on a roof, driveway or other surface visible from the air. The painting device itself can include weight members that facilitate opening the device in the air as well as ensuring the device lands on the target surface without drifting in the air. The painting device can also include flexible members that can be bent when the device is collapsed to fit in the receptacle, but which also bias the painting device towards a fully open (and flat) configuration when the device is outside the receptacle.

In some embodiments, the system can be manually deployed. In other embodiments, the system can be integrated into a structure, such as the roof of a house or other building. In this case, the system can be remotely actuated, for example, using a smart device in communication with an actuator controller. This allows a user to create a painted signal on a roof or other surface without requiring the user to leave the building, as going outside may be dangerous in disaster conditions (such as flooding, fire, or hurricane conditions).

Figure 1:
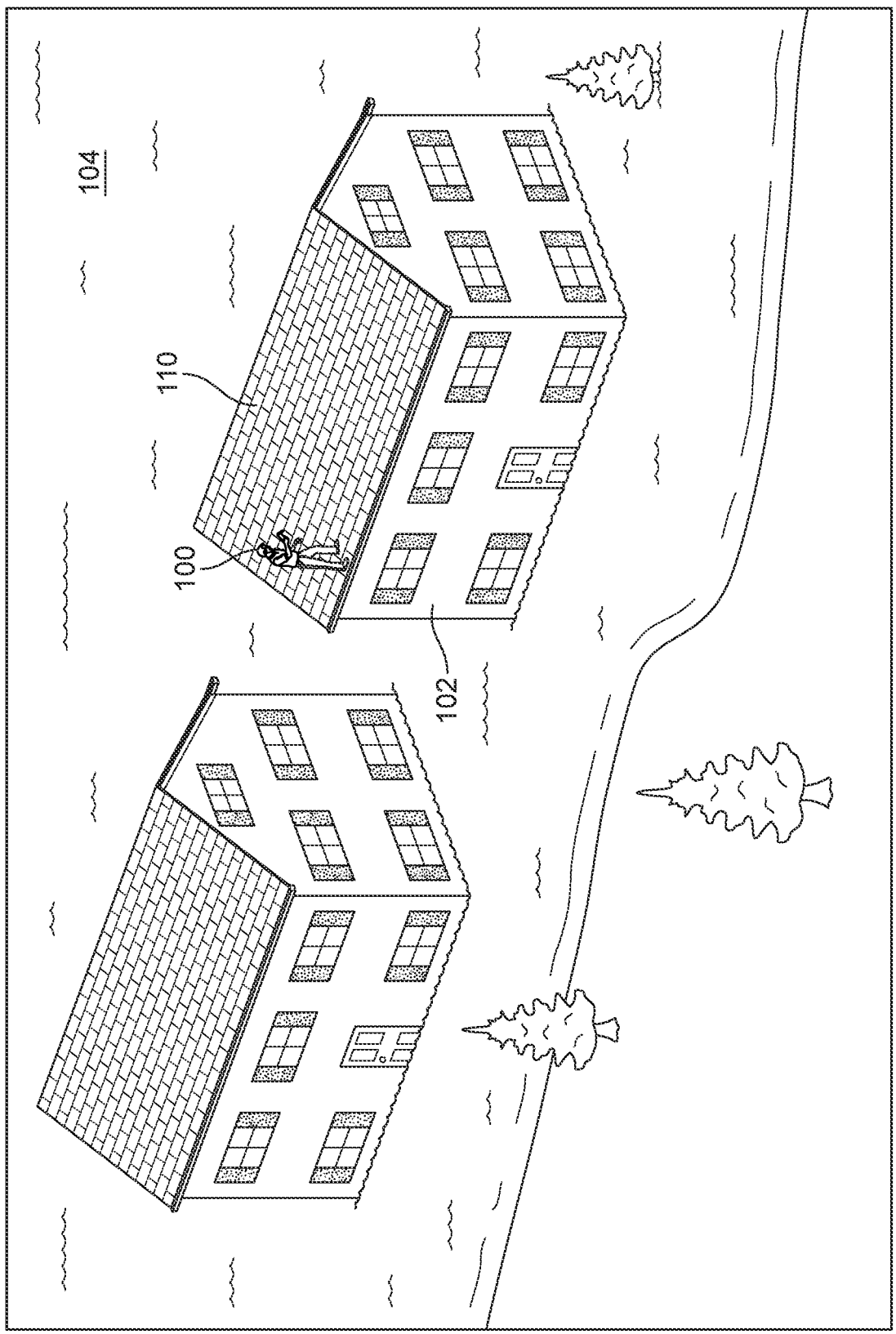
FIG. 1 is a schematic view of a scenario where an area has flooded and a resident is attempting to use an emergency signaling system, according to an embodiment.

FIG. 1 is a schematic view of a scenario in which a user 100 is trapped in their house 102 due to a flood 104 in their neighborhood. To increase the chances of being rescued, user 100 has climbed onto the roof 110 to deploy an emergency signaling system that may be recognized by search and rescue teams from the air.

Figure 2:
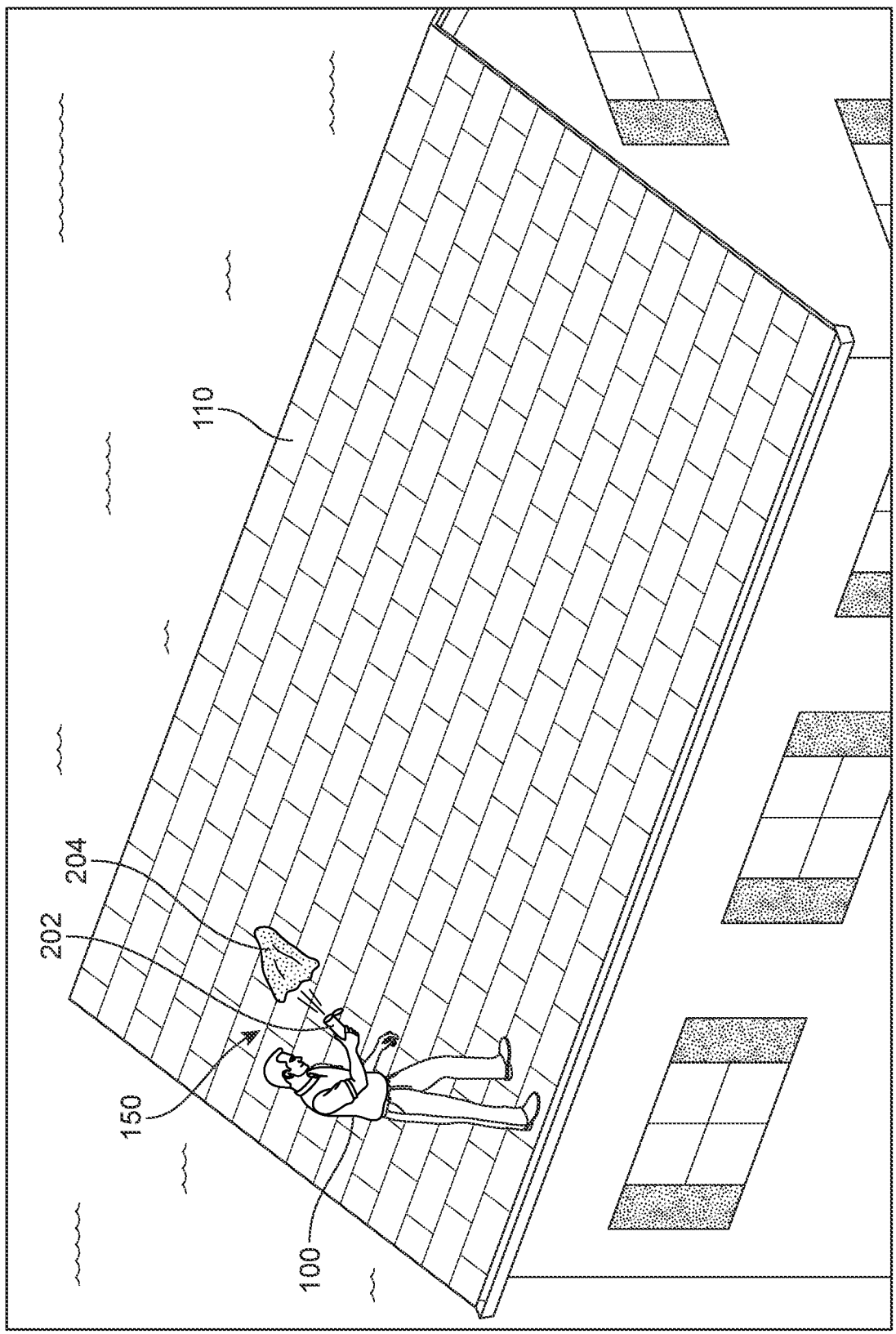
FIG. 2 is a schematic view of the user of FIG. 1 actuating an emergency signaling system.
Figure 3:
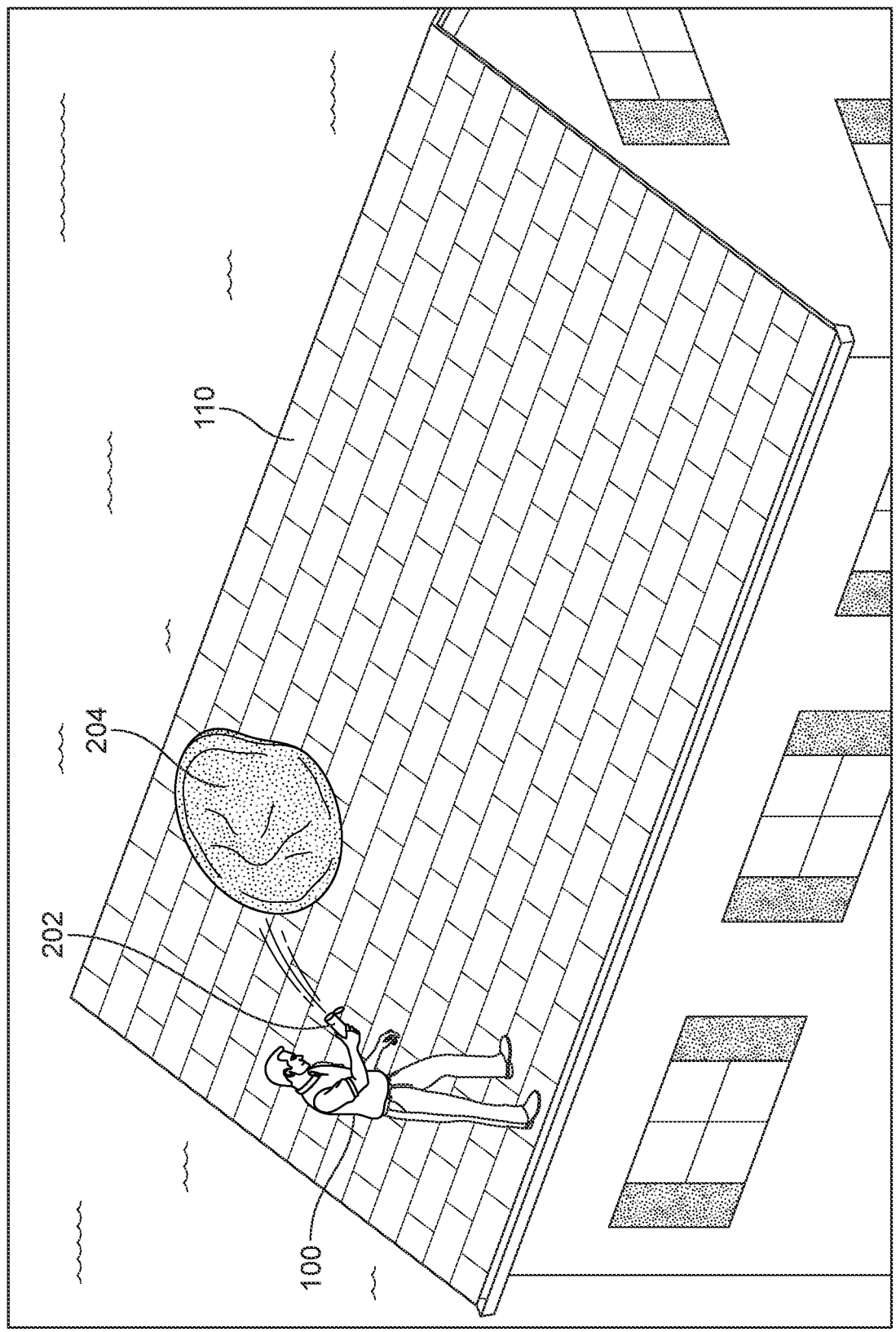
FIG. 3 is a schematic view of a painting device being deployed, according to an embodiment.
Figure 4:
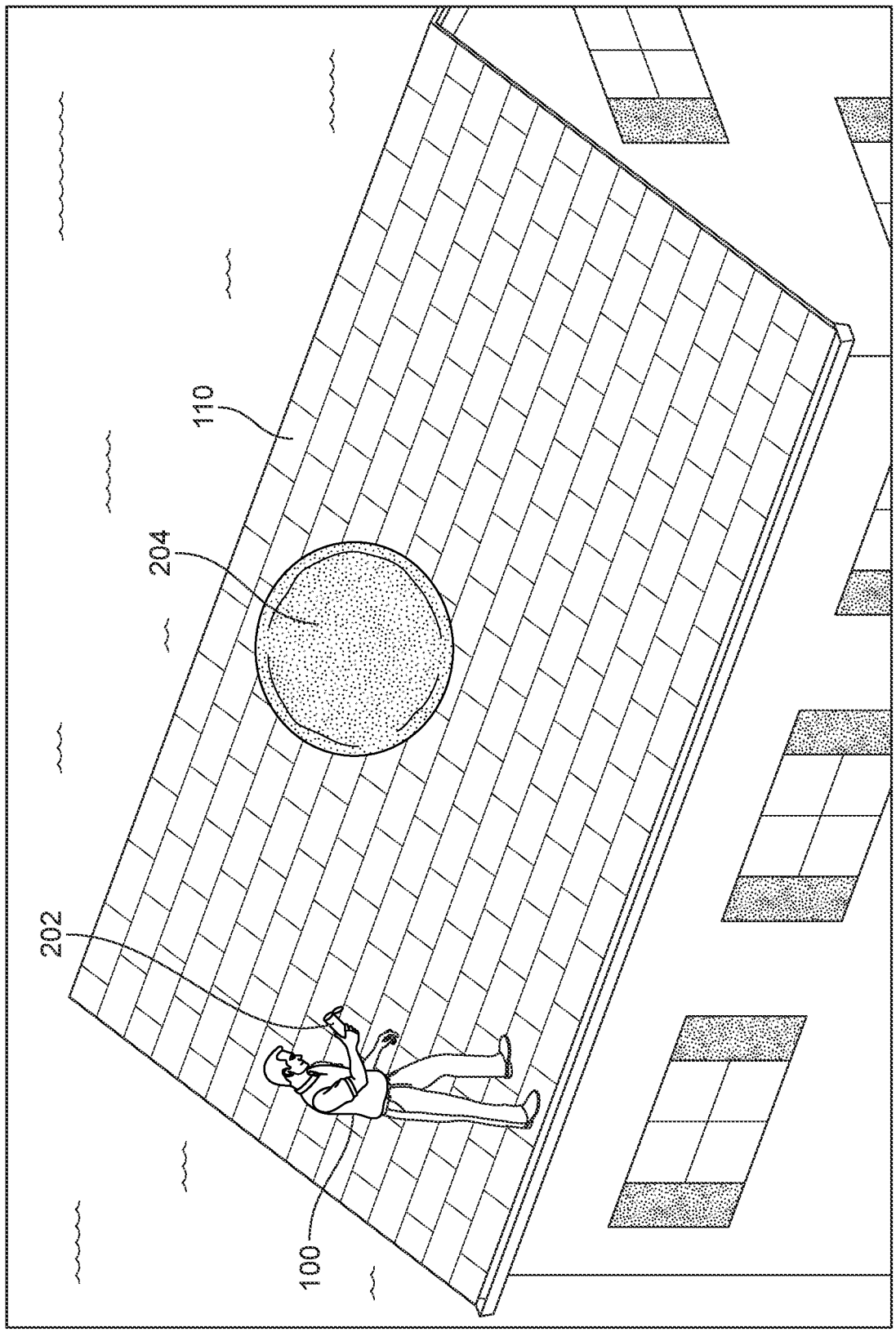
FIG. 4 is a schematic view of a painting device disposed on a roof of a house, according to an embodiment.

FIGS. 2-4 depict schematic views of user 100 deploying the emergency signaling system 150 onto roof 110. Starting in FIG. 2, user 100 actuates a receptacle 202. This has the effect of propelling a painting device 204 into the air. In FIG. 2, painting device 204 can be seen as beginning to open as it is launched into the air. In FIG. 3, painting device 204 has opened up to its full size and taken on a disc-like shape. In FIG. 4, painting device 204 has landed on a part of roof 110.

During many kinds of disasters, rain and wind may be present. This makes it likely that any moveable object placed on a surface (such as a roof) may be blown or washed away soon after the object has been deployed. The present system therefore uses paint to apply a "painted signal" that cannot be easily removed in rain or wind. Thus, even if the painting device is blown or washed away immediately after being deployed it will leave behind an identifiable signal on the surface that can be viewed for hours, days, or even weeks.

Figure 5:
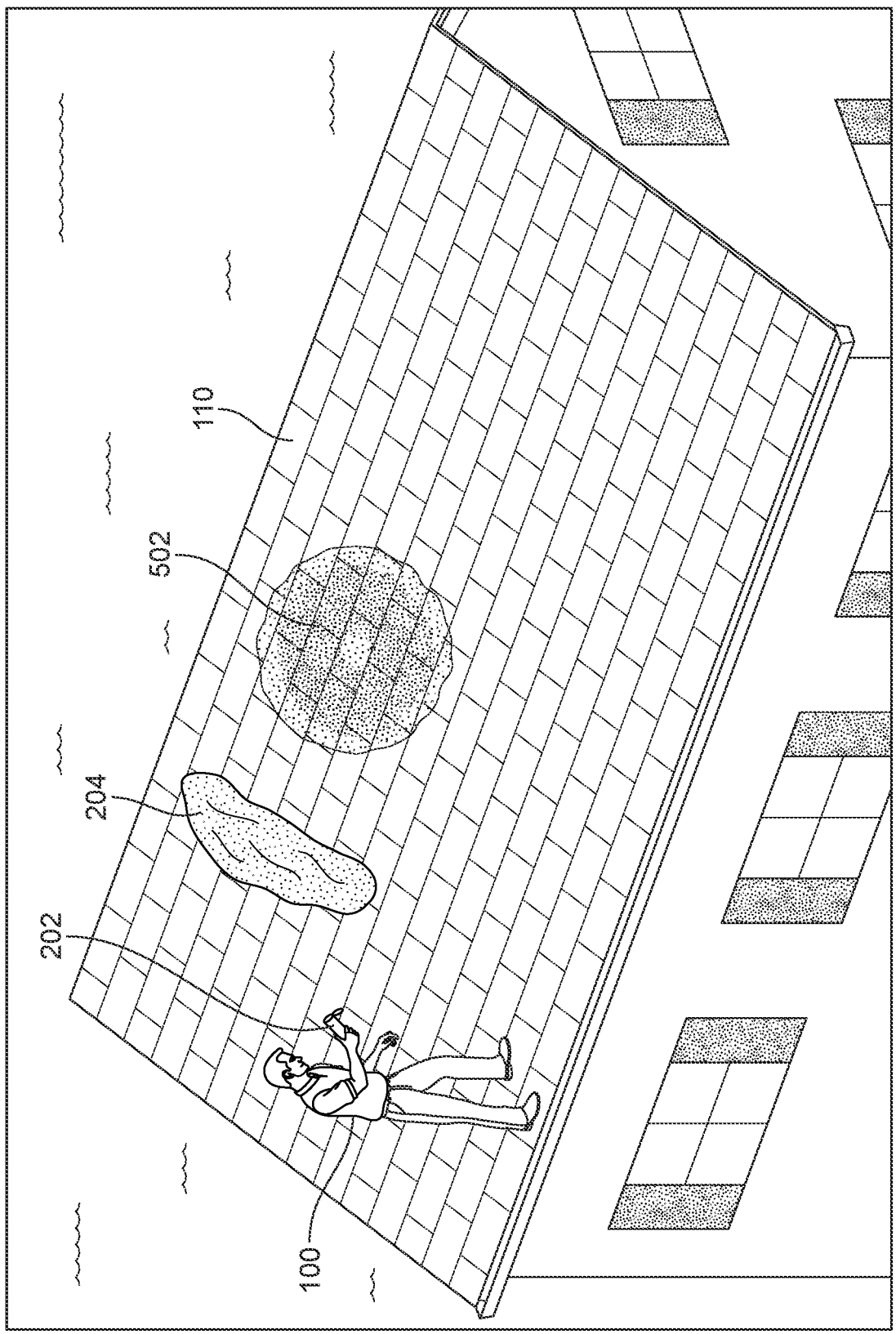
FIG. 5 is a schematic view depicting a painted signal created by the painting device of FIG. 4.

In the exemplary embodiments, the deployed painting device is coated in a paint material. This allows the painting device to paint or "stamp" the underlying surface (such as roof 110). This leaves behind a painted signal 502, as shown in FIG. 5, once painting device 204 has been removed (either manually, or due to wind, rain, etc.).

Figure 6:
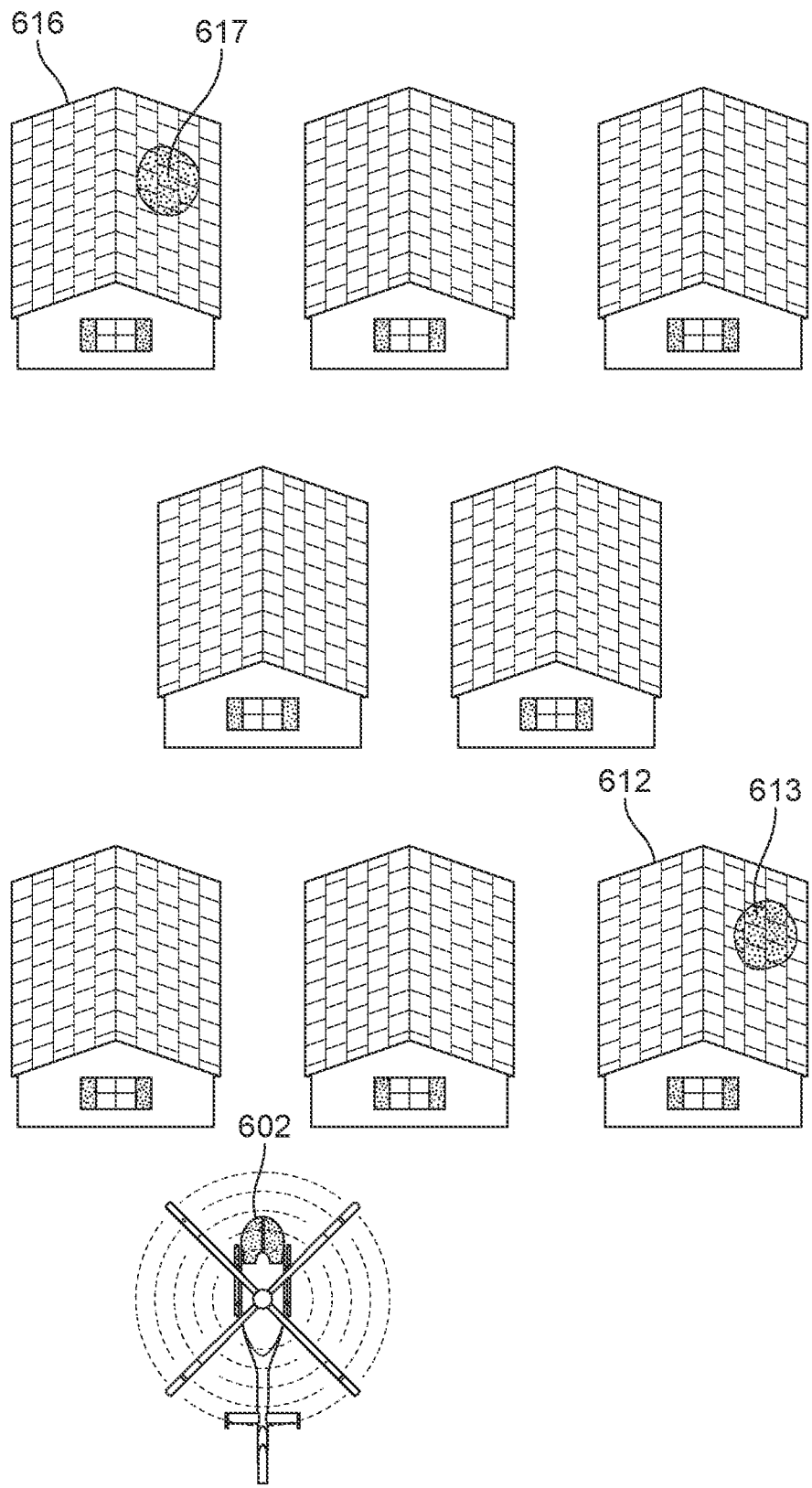
FIG. 6 is a schematic view of a scenario where a search and rescue vehicle is able to identify houses with painted signals to quickly find the locations of stranded residents.

As seen in FIG. 6, houses marked with painted signals can be readily identified from the air by search and rescue vehicles. In this case, occupants of helicopter 602 can easily identify home 612 (with painted signal 613) and home 616 (with painted signal 617) as locations where the residents may be in need of rescue.

Figure 7:
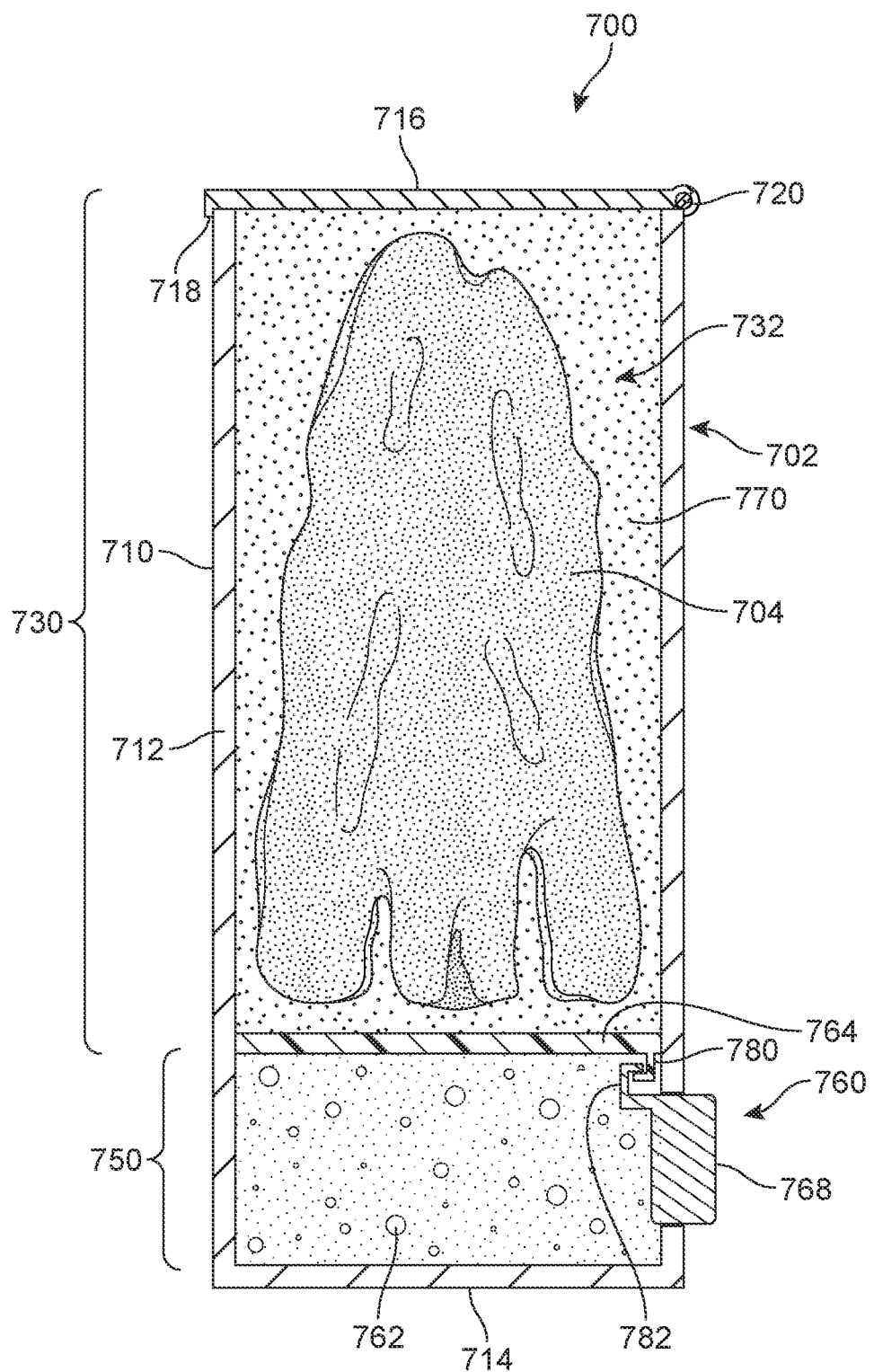
FIG. 7 is a schematic view of an embodiment of an emergency signaling system.

FIG. 7 illustrates an embodiment of an emergency signaling system 700. Referring first to FIG. 7, emergency signaling system 700 comprises a receptacle 702. Receptacle 702 comprises a container or housing that acts to store and also launch a painting device 704. In some embodiments, receptacle 702 may have the shape of a canister. In other embodiments, receptacle 702 could have any other suitable shape.

Receptacle 702 may include an outer housing portion 710. Outer housing portion 710 includes sidewalls 712 fixedly attached to a bottom wall 714. Outer housing portion 710 may also include a lid 716 that is attached to an upper periphery 718 of sidewalls 712. In one embodiment, lid 716 may be attached to sidewalls 712 by a hinge 720. In other embodiments, lid 716 may be attached to sidewalls 712 using another suitable connection.

The interior of receptacle 702 includes a storage portion 730 and a launching portion 750. Storage portion 730 comprises an interior cavity 732 that receives a painting device 704. Interior cavity 732 may be accessible through an opening when lid 716 is disposed in an open position.

Launching portion 750 may be disposed between storage portion 730 and bottom wall 714. Launching portion 750 further comprises an actuating assembly 760 that can be used to launch painting device 704. In the exemplary embodiment of FIG. 7, actuating assembly 760 is a pneumatic system that uses compressed air 762 to actuate a launching plate 764. More specifically, in an undeployed configuration, launching plate 764 is locked into place within housing portion 710 in a position that keeps air 762 in a compressed state. In the exemplary embodiment, locking plate 764 includes an engaging portion 780. Engaging portion 780 can be engaged by a latching portion 782 that is connected to an actuating button 768.

When button 768 is pressed, latching portion 782 is displaced from engaging portion 780. This releases launching plate 764 and allows compressed air 766 to push launching plate 764 towards the open end of housing portion 710. In some cases, pressing button 768 may also act to unlock lid 716 which can then swing open as the contents of interior cavity 732 are propelled out of housing portion 710.

As seen in FIG. 7, interior cavity 732 may also be filled with a quantity of paint material 770. Specifically, the quantity of paint material 770 may be sufficient so that painting device 704 can be submerged within the paint material while painting device 704 is stored for later use. By storing sufficient amounts of paint material to submerge painting device 704, this ensures that painting device 704 is coated with wet paint when launched onto a roof or other surface. This wet paint is then transferred to a roof or other surface to form a painted signal (for example, painted signal 502 from FIG. 5).

In different embodiments, different actuating mechanisms could be used. The type of mechanism selected may depend on factors including the desired speed and force necessary to launch a painting device. These factors may further depend on the weight and/or aerodynamic properties of the painting device.

Figure 8:
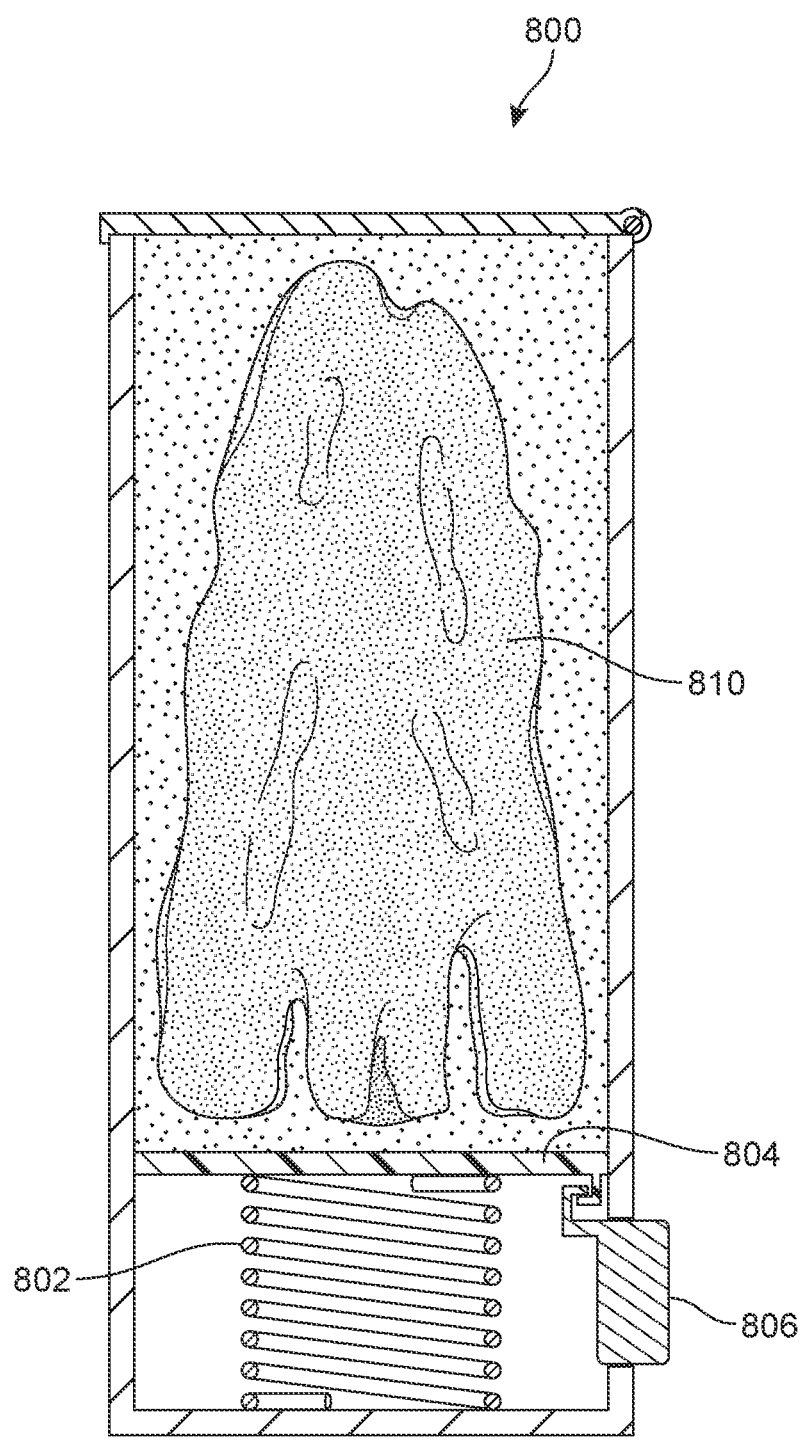
FIG. 8 is a schematic view of another embodiment of an emergency signaling system.

FIG. 8 is a schematic view of another example of a receptacle 800. Receptacle 800 may share some provisions with receptacle 700. However, in contrast to receptacle 700, receptacle 800 uses a spring-based actuating mechanism to launch a painting device. Specifically, receptacle 800 includes a compression spring 802. Compression spring 802 may be compressed and locked in place using launching plate 804 prior to deployment of the painting device. When the launching plate is released, as through an actuating button 806, compression spring 802 expands and generates the force necessary to propel painting device 810 from receptacle 800.

Figure 9:
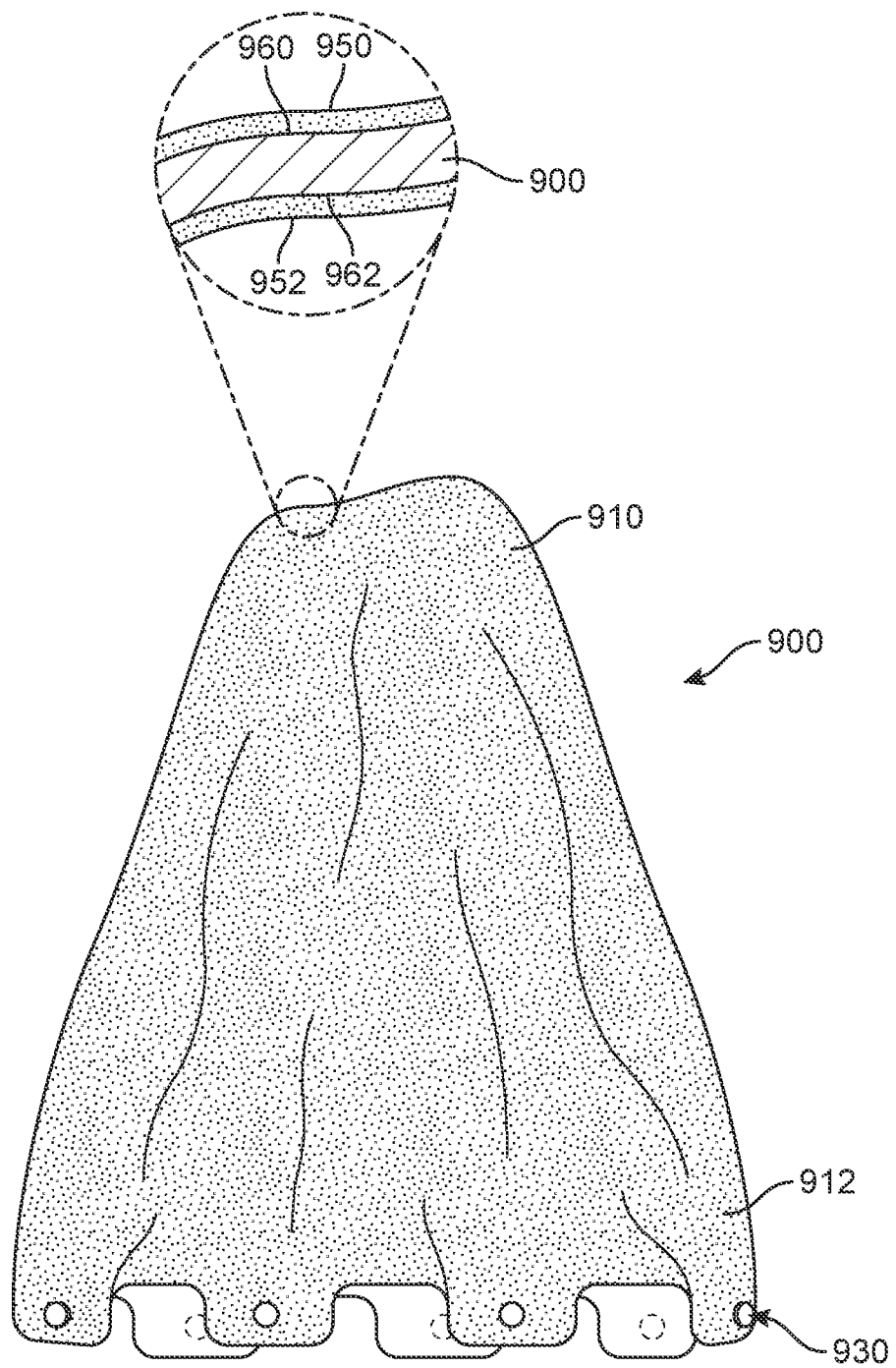
FIG. 9 is a schematic view of an embodiment of a painting device.

FIG. 9 is a schematic view of one embodiment of a painting device 900. Painting device 900 may include a central portion 910 and a peripheral portion 912. In some cases, painting device 900 may have a rounded or approximately circular shape. In such cases, peripheral portion 912 may comprise a circular peripheral portion. Moreover, painting device 900 may itself have an approximately disc-like, or circular, geometry.

Figure 10:
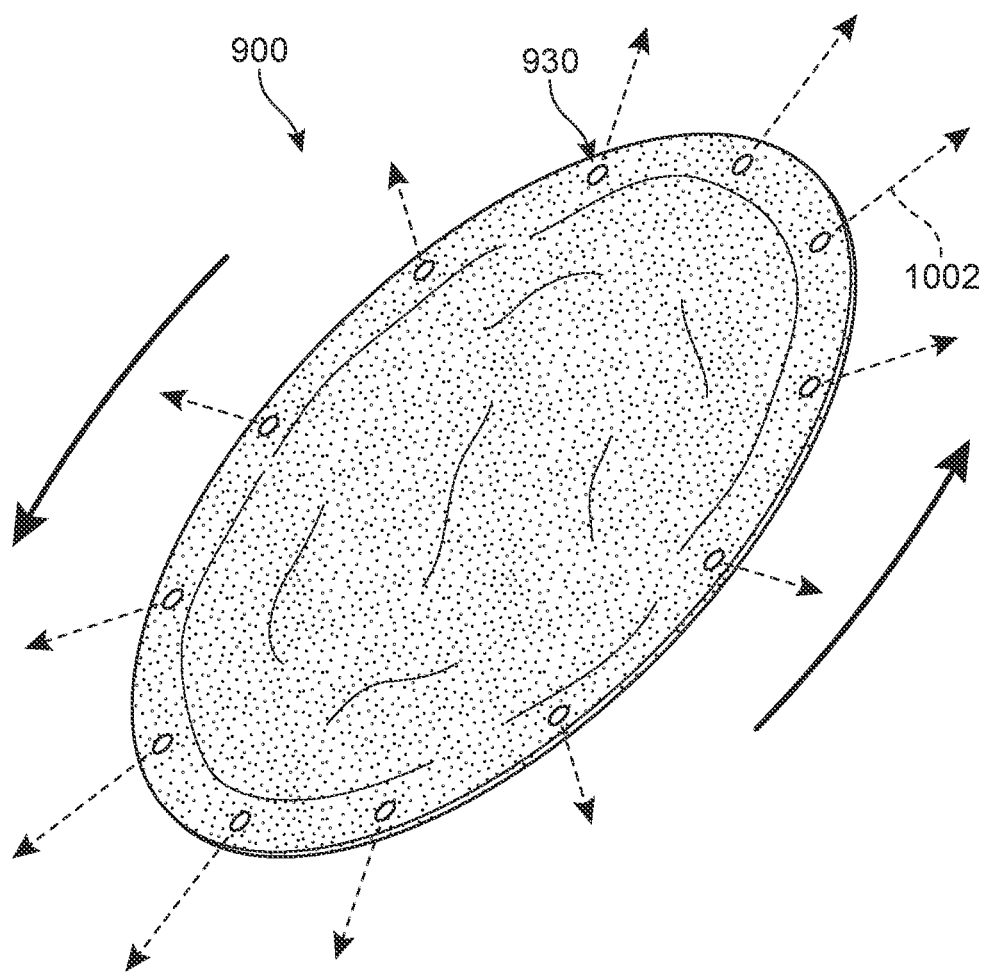
FIG. 10 is a schematic view of the painting device of FIG. 9, in which the painting device is completely open.

A painting device can include provisions for controlling its motion when launched from a receptacle. In some embodiments, painting device 900 may comprise a plurality of weight members 930 disposed along peripheral portion 912. Weight members 930 may comprise suitably sized weights that can help ensure painting device 900 doesn't drift in the wind after it has been launched. Weight members 930 may also help ensure that painting device 900 opens up when launched. For example, as shown in FIG. 10, if angular momentum is imparted to painting device 900 as it is launched, a centrifugal force 1002 pushes out each of the weight members 930. In some cases, angular momentum could be imparted to painting device 900 by configuring a launch plate to rotate as it is driven towards an opening of the receptacle.

As also shown in FIG. 9, painting device 900 may be coated with a paint material prior to being launched from a receptacle. In some cases, painting device 900 may be coated with a first layer 950 of paint material along a first side 960 of painting device 900, as well as with a second layer 952 of paint material along a second side 962 of painting device 900. Using a coating of paint material on both sides of the device helps ensure that a painted signal can be applied to a surface regardless of which side of the painting device lands facing down.

Embodiments of painting devices need not be limited to circular geometries. In other embodiments, other suitable geometries could be used. In some cases, distinctive geometries could be used to make the resulting painted signal more readily identifiable, especially from farther away. Distinctive geometries may also be used to help distinguish the painted signals from other markings on buildings or ground surfaces.

Figure 11:
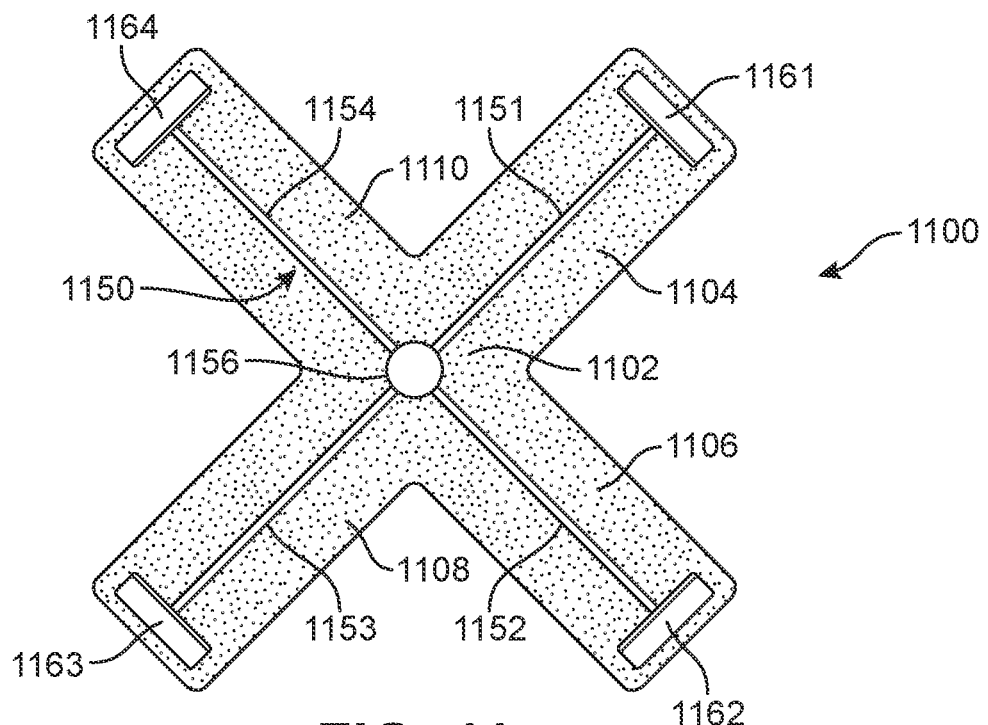
FIG. 11 is a schematic view of another embodiment of a painting device.

FIG. 11 is a schematic view of another embodiment of a painting device. By contrast to the circular geometry of painting device 900, for example, painting device 1100 has a cross or X-like geometry. Specifically, painting device 1100 is comprised of a central portion 1102, a first arm portion 1104, a second arm portion 1106, a third arm portion 1108, and a fourth arm portion 1110. Each arm portion extends out from central portion 1102.

In the exemplary embodiment of FIG. 11, painting device 1100 includes flexible frame members 1150. Flexible frame members 1150 may be bent to allow painting device 1100 to fold and fit within a receptacle. However, once painting device 1100 is launched, flexible frame members 1150 return to a biased state where they extend straight out from central portion 1102. This causes each arm portion to fully extend and biases painting device 1100 into a fully opened state associated with the X-like geometry.

Specifically, flexible frame members 1150 include first flexible frame member 1151, second flexible frame member 1152, third flexible frame member 1153, and fourth flexible frame member 1154. Each frame member may extend from a central frame element 1156 at central portion 1102. Furthermore, each frame member may include a T-like member at the end. Specifically, first flexible frame member 1151 ends at a first T member 1161, second flexible frame member 1152 ends at a second T member 1162, third flexible frame member 1153 ends at a third T member 1163, and fourth flexible frame member 1154 ends at a fourth T member 1164. These T shaped members may help keep the arm portions opened (or flattened) in a width-wise direction. Moreover, in some cases, the T-shaped members could also be weighted to further facilitate opening the painting device as it is deployed, and to ensure it comes down without drifting.

The X-like shape of painting device 1100 may help make the resulting painted signal more readily identifiable. In particular, it is unlikely that a member of a search and rescue team might miss an X-shaped signal from the air.

Figure 12:
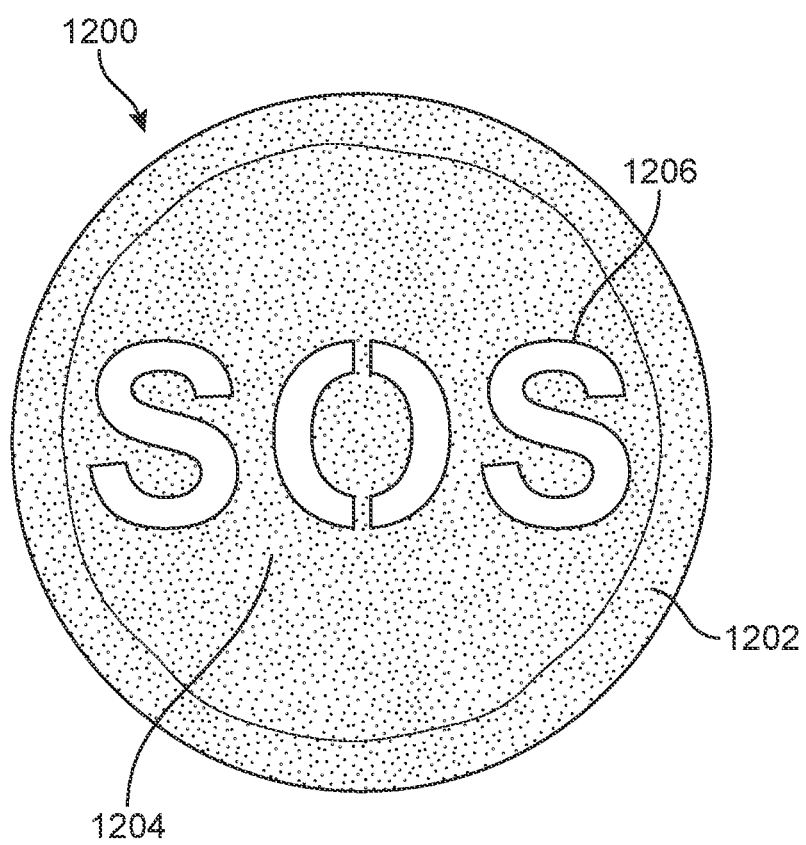
FIG. 12 is a schematic view of another embodiment of a painting device.

FIG. 12 depicts yet another embodiment of a painting device. In this case, painting device 1200 comprises a circular peripheral portion 1202. However, central portion 1204 has openings 1206 that spell out "SOS", a well-known distress call.

In some embodiments, an emergency signaling system could be integrated into a home or other structure. For example, an emergency signaling system could be permanently attached to the roof of a homeowner's house. This may allow the system to be deployed remotely, without requiring the user to leave the house in order to deploy a painting device.

Figure 13:
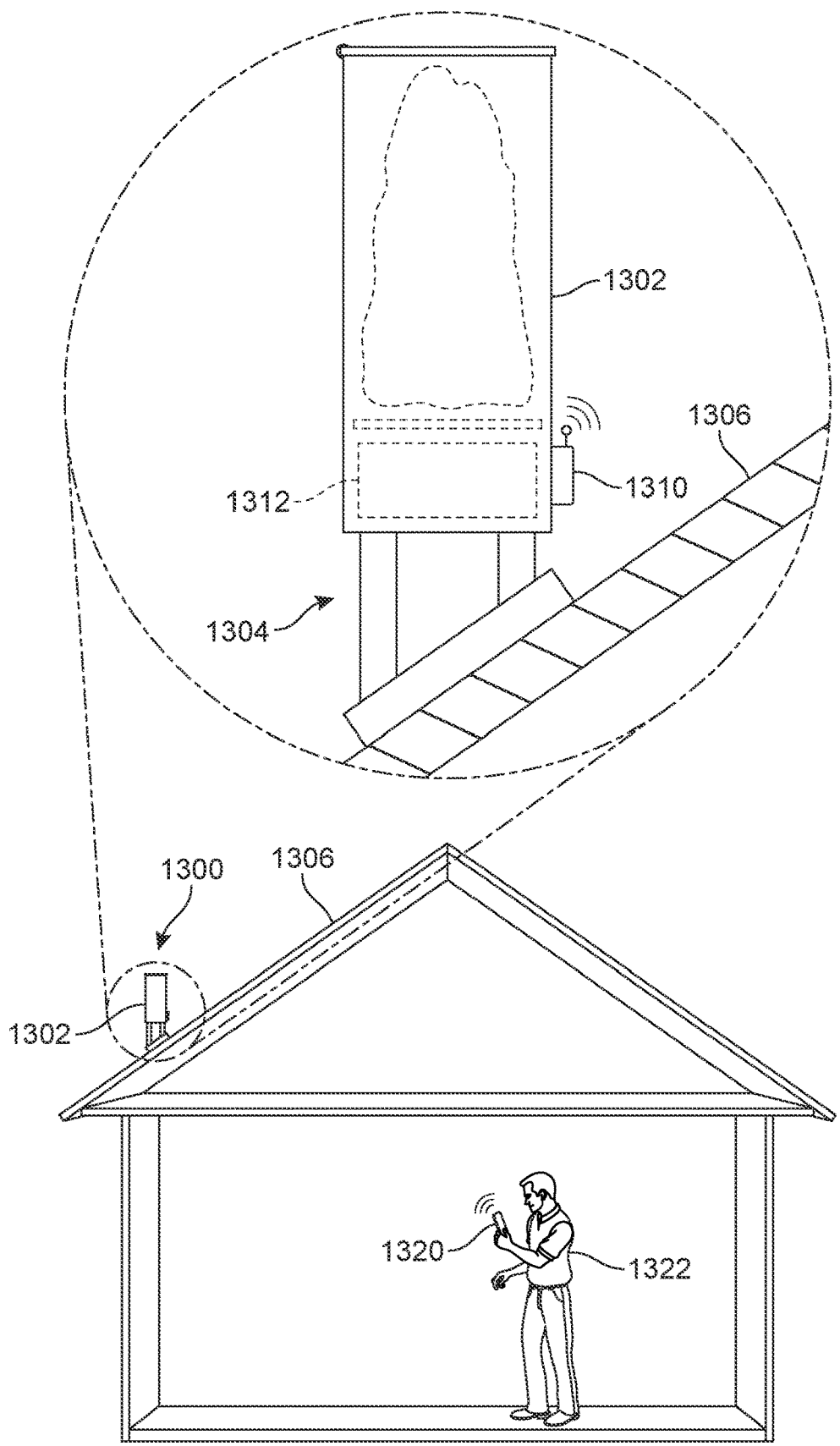
FIG. 13 is a schematic view of another embodiment of an emergency signaling system.

FIG. 13 is a schematic view of another embodiment of an emergency signaling system. In this embodiment, emergency signaling system 1300 may be attached directly to a user's roof. Specifically, receptacle 1302 may include a mounting portion 1304 that can be secured directly to roof 1306. In such an embodiment, receptacle 1302 may be equipped with a remote actuating system, whereby a user can remotely activate the system. For example, receptacle 1302 may include an actuating controller 1310 that can automatically control an internal actuating assembly 1312. Actuating controller 1310 may be configured to receive control signals from a remote device 1320 that can be operated by a user 1322. Remote device 1320 could be stand-alone remote device or could be any suitable computing device running an application configured to communicate with actuating controller 1310. Examples of computing devices include mobile phones, tablets, laptops, and desktop computing devices. Communication between an actuating controller and a remote device could be accomplished using any known communication methods or protocols. In some embodiments, communication may occur using any suitable radio-based signal. Using this exemplary system, a painting device can be remotely deployed by a user during or after a natural disaster, such as a flood, fire, or hurricane.

The embodiments may be used to create painted signals on a variety of different surfaces, and are not limited to use with roofs. Other suitable surfaces where a painting device could be deployed to create a painted signal could include, but are not limited to: driveways, lawns, exterior walls of a house or other building, parking lots, or other suitable surfaces.

The embodiments can make use of any suitable materials for components of the emergency signaling system. For example, the painting device materials could comprise any sufficiently flexible and durable material. Examples of suitable materials may include, but are not limited to: canvas, polyester coated with polyurethane, or plastic materials (such as polyethylene). The materials may be selected to be compatible with paint material. Specifically, the materials may be chosen to ensure that the painting device efficiently transfers paint from the receptacle to the target surface (such as a roof, lawn, driveway, or other surface). The materials may also be selected to ensure that the painting device does not soak up an amount of paint material that would make it too heavy to be effectively launched onto a surface.

The receptacle materials could comprise a sufficiently rigid material. Examples of suitable materials may include, but are not limited to plastic materials and metal materials. Receptacle materials me be selected to be sufficiently watertight so that paint material does not leak out of the receptacle when the receptacle is being stored. Receptacles that use pneumatic actuation may also be sufficiently air-tight to ensure that sufficient pressure is maintained in the receptacle prior to deployment of the painting device.

Exemplary paint materials include, but are not limited to acrylic based paints, oil-based paints, and paints including enamel. Paint materials may be selected according to a variety of factors including transferability, stability during storage, and degree of permanence. For example, it may be desirable to use paint materials that can be easily transferred from a painting device to a surface (such as a roof). Paint materials may also be selected according to their compatibility with a wide range of surfaces, such as shingles, concrete, and grass. Because the receptacle may be stored for several years before it may be used, paint materials may be selected to ensure that the paint material does not deteriorate substantially over this period. Because the emergency signaling system may be used in scenarios where there may be substantial rain and/or flooding, the paint material may be selected to ensure the painted signal cannot be easily washed away.

While the embodiments describe a system that can apply paint material to a surface, other embodiments could incorporate other kinds of "coloring" substances. For example, in another embodiment, a painting device could be covered in a colored gel and may apply the gel to a surface. In another embodiment, a painted device could be covered in a foam and may apply the foam to a surface. In another embodiment, a painted device could be covered in a powder and may apply the powder to a surface.

Paint materials may be selected to have any suitable color. In some cases, colors may be selected so that the painted signal is readily identifiable from far away. Therefore, bright colors may be selected that contrast substantially with conventional colors for roofs, concrete, and lawn. Examples of colors that could be used include yellow, red, pink, and orange. In other embodiments, any suitable color could be used.

The dimensions of one or more components could also vary from one embodiment to another. For reference, the longest dimension of a painting device (when fully opened) may be referred to as its footprint. For example, a circular painting device with a diameter of 2 feet has a 2 foot footprint. In some cases, the footprint could vary in a range between 2 feet and 10 feet. In other cases, the footprint could have a footprint approximately in the range between 10 feet and 20 feet. The footprint may be selected so that the resulting painted signal is sufficiently large enough to be viewed from far away. The footprint may also be selected so that the painting device can be closed and still fit within a suitably sized receptacle.

An emergency signaling system could be constructed so that the system can be used only once before one or more components have to be thrown away. Alternatively, a system could be constructed so that one or more components could be reused.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A deployable device for use in an emergency, comprising:
   a painting device having a rounded shape comprising a central portion and a peripheral portion;
   and
   a plurality of flexible frame members attached to the painting device,
   wherein the deployable device has a folded configuration in which the plurality of flexible frame members are all bent and a fully open configuration in which the plurality of flexible frame members bias the painting device towards the fully open configuration.

2. The deployable device according to claim 1, further comprising a plurality of weight members, wherein each weight member is disposed at an end of a respective one of the plurality of flexible frame members.

3. The deployable device according to claim 1, wherein the deployable device is configured to be placed in a canister configured in the folded configuration.

4. The deployable device according to claim 3, wherein the deployable device is configured to be launched from the canister and wherein the deployable device takes on the fully open configuration after being launched from the canister.

5. The deployable device according to claim 1, further comprising a paint material coating one side of the painting device.

6. The deployable device according to claim 1, further comprising a paint material coating both sides of the painting device.

7. A system for use in an emergency, comprising:
   a deployable device comprising:
      a painting device having a rounded shape comprising a central portion and a peripheral portion;
      and
      a plurality of flexible frame members attached to the painting device;
   a storage portion comprising an interior cavity, wherein the deployable device has a folded configuration in which the plurality of flexible frame members are all bent and the deployable device is disposed in the interior cavity; and
   a launching portion having a compressed state.

8. The system according to claim 7, wherein the deployable device further comprises a plurality of weight members, wherein each weight member is disposed at an end of a respective one of the plurality of flexible frame members.

9. The system according to claim 7, wherein the deployable device has a fully open configuration outside of the interior cavity in which the plurality of flexible frame members bias the painting device towards the fully open configuration.

10. The system according to claim 9, wherein the deployable device is configured to be launched from the storage portion by the launching portion and wherein the deployable device takes on the fully open configuration after being launched from the interior cavity.

11. The system according to claim 7, further comprising a paint material coating one side of the painting device.

12. The system according to claim 7, further comprising a paint material coating both sides of the painting device.

13. The system according to claim 7, further comprising:
   an actuating button; and
   a latching portion connected to the actuating button, wherein the latching portion locks the launching portion in place.

14. The deployable device according to claim 7, wherein the launching portion comprises a pneumatic system.

* * * * *